Sept. 27, 1966  J. A. READ  3,275,301
SHEAVE PULLEY
Filed Oct. 1, 1964
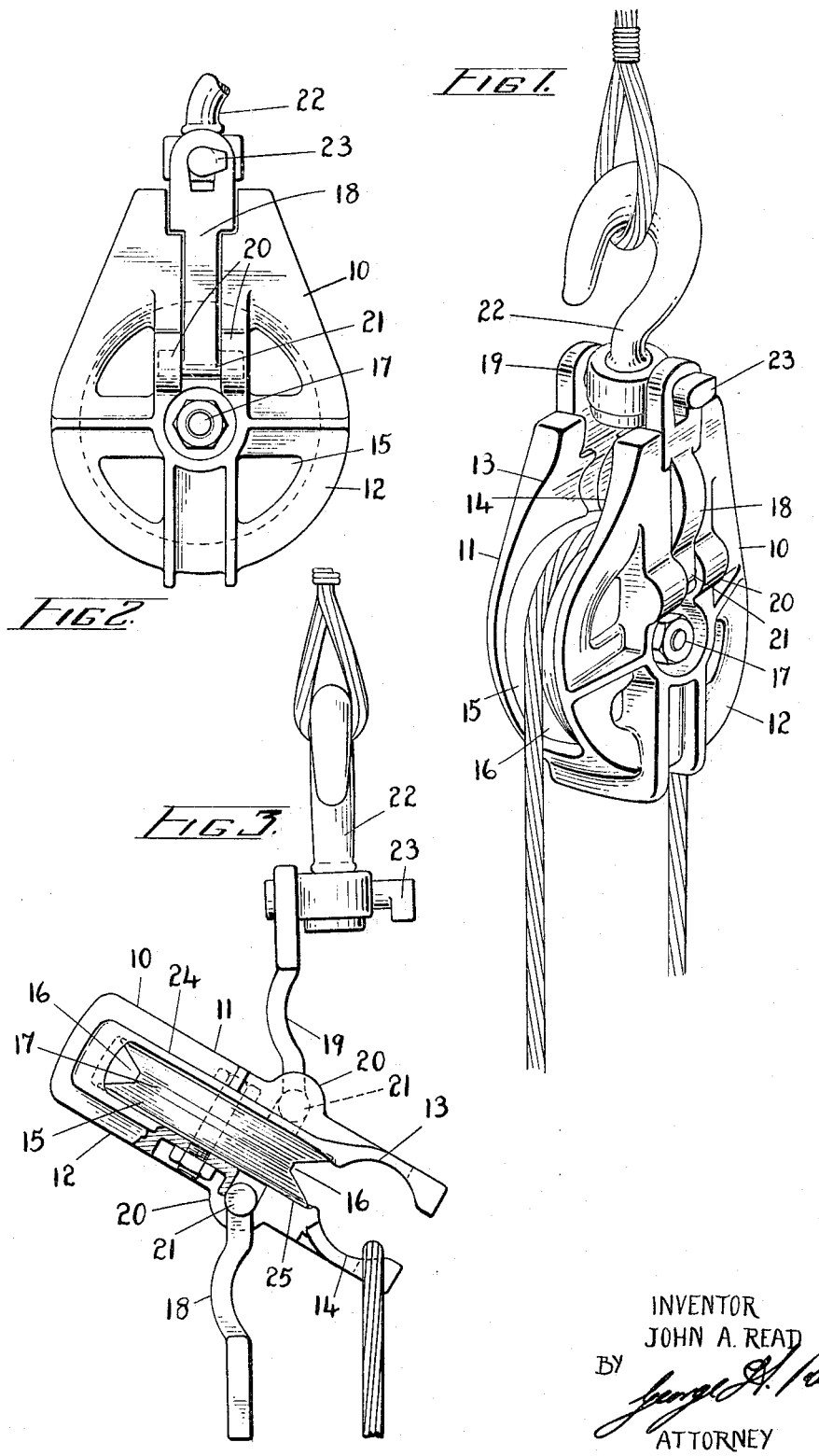
INVENTOR
JOHN A. READ
BY
ATTORNEY

United States Patent Office 3,275,301
Patented Sept. 27, 1966

3,275,301
SHEAVE PULLEY
John A. Read, R.R. 2, North Bay, Ontario, Canada
Filed Oct. 1, 1964, Ser. No. 400,722
2 Claims. (Cl. 254—194)

This invention relates to a sheave pulley of the type which is used in lifting and moving articles by means of ropes, cables and the like.

Sheave pulleys having blocks which are provided with opening gates are well known. Two gates are commonly provided, each being hinged to a respective side of the block body. Both gates are attached to a suspension means such as a hook, but at least one gate may be released by means of a latch. A pulley of this type makes it convenient for the operator to insert the rope or cable into the block and remove it therefrom when required.

However, the known pulleys provided with opening gates have two important disadvantages. Firstly, the operator may leave the gate open after inserting the rope or cable. This may result in damage to the block when a load is applied and is also a safety hazard as the load may drop after being lifted part way. Secondly, due to the structure of the blocks commonly used the gate may become unlatched during operation and cause the damage and danger referred to above.

An object of my invention is to provide a sheave pulley which has a novel construction of the gates to overcome the disadvantage referred to above.

In the drawings illustrating my invention:

FIGURE 1 is a perspective view of a novel sheave pulley;

FIGURE 2 is a side elevation of the pulley of FIGURE 1, and

FIGURE 3 is an end view, partially cut away, of the pulley of FIGURE 1, in an open position.

My pulley generally comprises a block body 10 having side plates 11 and 12 and cable guides 13 and 14. A sheave 15 having a peripheral groove 16 is mounted between the side plates 11 and 12 by means of the bolt 17.

The block body 10 is provided with gates 18 and 19 which are hinged to the respective side plates 11 and 12. As will be explained hereinbelow it is preferable that the gates 18 and 19 be hinged in a manner that will avoid the use of bolts. In the illustration each side plate 11 and 12 is provided with spaced bosses 20 which form a yoke into which the T shaped head 21 of the respective gate 18, 19 may be inserted to provide a hinge.

It has also been found in the working of my invention that the gates 18 and 19 must be hinged on the side plates 11 and 12 at a point subjacent the upper inner periphery of the groove 16 of the sheave 15. It is preferable that the pivot point be approximately midway between the upper periphery of the sheave 15 and the bolt 17.

The ends of the gates 18 and 19 opposite the T shaped heads 21 are attached to a suspension means 22 which may be a hook as illustrated in the drawing or a shackle. The gate 18 is releasably attached to the suspension means 22 by means of a conventional latch 23.

It will be seen that in the working of my invention the gate 18 may be readily unlatched to insert a cable into the block. However, if the gate 18 is left open by error, as soon as a load is applied to the cable 24, the block will tilt as illustrated in FIGURE 3. Thus, unlike the previously known pulleys of this type, if the side gate is left open the cable 24 will be safely ejected before the load leaves the ground.

As mentioned hereinbefore one disadvantage found in pulleys provided with side gates is that the gates sometimes become unlatched during use. This may be a particular danger in the novel pulley I have described and illustrated herein as the load would be immediately dropped. However, I have overcome this problem by largely eliminating the bolts which were previously required to assemble these pulleys. I have found that the bolts tend to come loose and thus tend to cause the gate to open and damage the block.

I have reduced the number of bolts in two ways. Firstly, as explained above, I have avoided the use of bolts for hinging the gates 18 and 19 to the block body 10. Secondly, I have formed the block body 10 including the side plates 11 and 12 and the cable guides 13 and 14 in one integral piece of metal, thus eliminating the need for bolts to assemble the blocks. Only the one bolt 17 is needed in my pulley which forms the axle for the sheave bearings and helps support the side plates 11 and 12.

It is also desirable in sheave pulleys that the inside surfaces 24 and 25 of the side plates 11 and 12 be recessed to receive the outer rims of the sheave 15. This adaption prevents the rope or cable from being caught between the sheave and the block body. Normally in order to incorporate this feature the side plates are manufactured in separate pieces and assembled with the sheave by use of bolts. However, I have found that I may incorporate the feature of recessed side plates in the one piece block body which I propose to use in my invention. The block body is flexible enough to enable the side plates 11 and 12 to be spread apart to insert the sheave.

What I claim as new and desire to protect by Letters Patent of the United States is:

1. A sheave assembly consisting essentially in the combination of, a substantually U-shaped unitary body portion having a pair of spaced parallel side plates interconnected at the lower ends thereof by an integral bight section; a sheave mounted for rotation in said body portion between said side plates, said side plates and said bight section being recessed, at least in part, to receive the rims of the sheave flanges, said side plates extending upwardly from adjacent the axis of rotation of the sheave, each extended portion of each plate being bifurcated; gate means pivotally mounted at one end thereof at the bifurcation of each side plate subjacent the upper perimeter of the sheave, the other end of each gate means extending upwardly of the side plates and including apertures for cooperation with latching means connected to suspension means, the portions of said side plates and said gate means located above the sheave being concave on the inner surfaces thereof.

2. A sheave assembly as defined in claim 1 wherein the gate apertures are key-hole slots and said latching means comprises a rotatable pin mounted on the suspension means, said pin including a key-hole lug means for cooperation with said key-hole slots.

References Cited by the Examiner

UNITED STATES PATENTS

| | | | |
|---|---|---|---|
| 700,212 | 5/1902 | Louden | 254—197 |
| 720,984 | 2/1903 | Straub | 254—193 |
| 984,141 | 2/1911 | Lamberth | 254—193 |
| 1,010,018 | 11/1911 | Christensen | 254—193 |
| 1,908,784 | 5/1933 | Peterson | 254—193 |
| 2,176,392 | 10/1939 | Coy | 254—193 |
| 2,197,698 | 4/1940 | Lamberth | 254—193 |

FOREIGN PATENTS

| | | |
|---|---|---|
| 1,045,325 | 6/1953 | France. |
| 842,664 | 7/1960 | Great Britain. |

SAMUEL F. COLEMAN, *Primary Examiner.*